United States Patent [19]

Mosca

[11] 3,808,460

[45] Apr. 30, 1974

[54] SAWTOOTH-VOLTAGE GENERATOR WITH FREQUENCY-INDEPENDENT AMPLITUDE

[75] Inventor: Virgilio Mosca, Milano, Italy

[73] Assignee: Societa Italiana Telecommunicazioni Siemens S.p.A., Milan, Italy

[22] Filed: Dec. 29, 1972

[21] Appl. No.: 319,173

[30] Foreign Application Priority Data

Dec. 29, 1971 Italy .................................. 33072/71

[52] U.S. Cl.. 307/228, 307/234;246;261, 328/34;35

[51] Int. Cl. ........................... H03k 3/00, H03k 4/00

[58] Field of Search ........... 307/227, 228, 234, 246, 307/261; 328/34, 35

[56] References Cited

UNITED STATES PATENTS

| | | | |
|---|---|---|---|
| 2,835,809 | 5/1958 | Taylor | 307/228 |
| 2,914,685 | 11/1959 | McVey | 307/228 |
| 3,105,160 | 9/1963 | Adler | 307/228 |
| 3,178,593 | 4/1965 | Diehl | 307/228 |
| 3,225,310 | 12/1965 | Stratton et al. | 307/228 |
| 3,315,101 | 4/1967 | Smith | 307/228 |
| 3,706,890 | 12/1972 | Clements et al. | 307/227 |
| 3,719,834 | 3/1973 | Dao | 307/228 |

*Primary Examiner*—Andrew J. James
*Attorney, Agent, or Firm*—Karl F. Ross; Herbert Dubno

[57] ABSTRACT

A sawtooth-voltage generator includes a capacitance with a resistive charging circuit and a normally blocked discharge path which is periodically unblocked in response to a train of timing pulses, the voltage developed across this capacitance being also applied to an input of a high-gain differential amplifier having another input connected to a source of reference potential of a magnitude equaling half the desired sawtooth amplitude. The output of the differential amplifier, delivered to the charging circuit by way of an R/C network of large time constant, has the form of a square wave oscillating about the reference potential with a frequency corresponding to the pulse cadence.

4 Claims, 2 Drawing Figures

SAWTOOTH-VOLTAGE GENERATOR WITH FREQUENCY-INDEPENDENT AMPLITUDE

FIELD OF THE INVENTION

My present invention relates to a sawtooth-voltage generator of the type used, for example, to deflect the beam of a cathode-ray tube in a television camera or receiver.

BACKGROUND OF THE INVENTION

Conventional sawtooth-voltage generators utilize a capacitance which is charged from a source of direct current through a series resistor and is periodically discharged in a path controlled by an electronic switch. The repetition frequency or cadence of the pulses controlling that switch determines the frequency of the resulting sawtooth wave as well as the amplitude of that wave which, with linear charging, is proportional to the pulse period.

The pulse cadence and therefore the sweep rate may vary for different uses, e.g., for the transmission of live television shows or facsimile messages. Also, the sweep rates are not uniform throughout the world since they are generally derived from the standard frequency of the local utilities network which is 50 Hz in Europe and 60 Hz in the United States. Thus, if for any reason it is necessary to change the sweep rate of a television transmitter or receiver, the sweep amplitude varies proportionally unless special means are provided for holding that amplitude constant.

OBJECTS OF THE INVENTION

The general object of my present invention, therefore, is to provide a sawtooth-voltage generator whose amplitude is independent of its operating frequency and therefore of the cadence of its control pulses.

A more specific object is to provide a system of this character generating a highly linear sawtooth voltage.

SUMMARY OF THE INVENTION

I have found, pursuant to the present invention, that the aforestated objects can be realized by the provision of electronic switchover means with two operating conditions generating respective output currents of two different levels, the switchover means being provided with a first input connection extending to a terminal of the periodically charged capacitance and with a second input connection extending to a point of fixed reference potential; an integrating network connects the switchover means across this capacitance in its charging circuit for energizing same, this network having a time constant which is large compared to the recurrence period of the control pulses. Whenever the terminal voltage of the capacitance reaches the reference potential, a change occurs from the first to the second current level whereby, as will be shown in detail hereinafter, the peak voltage developted across this capacitance is stabilized independently of the pulse cadence at substantially twice the reference potential.

According to a more specific feature of my invention, the switchover means is constituted by a differential amplifier whose output current reverses between the two levels, flowing in the charging direction at the first level and in the discharging direction at the second level. If the integrating network includes a capacitor of a magnitude substantially exceeding the charging capacitance across which the sawtooth voltage is developed, the two opposite current flows are approximately equal and of substantially the same duration.

The charging capacitance may be provided, in a manner known per se, with a linearization circuit including an ancillary current source connected to the junction of two series condensers representing that capacitance.

BRIEF DESCRIPTION OF THE DRAWING

The above and other features of my invention will now be described in detail with reference to the accompanying drawing in which.

SPECIFIC DESCRIPTION

Figure 1:
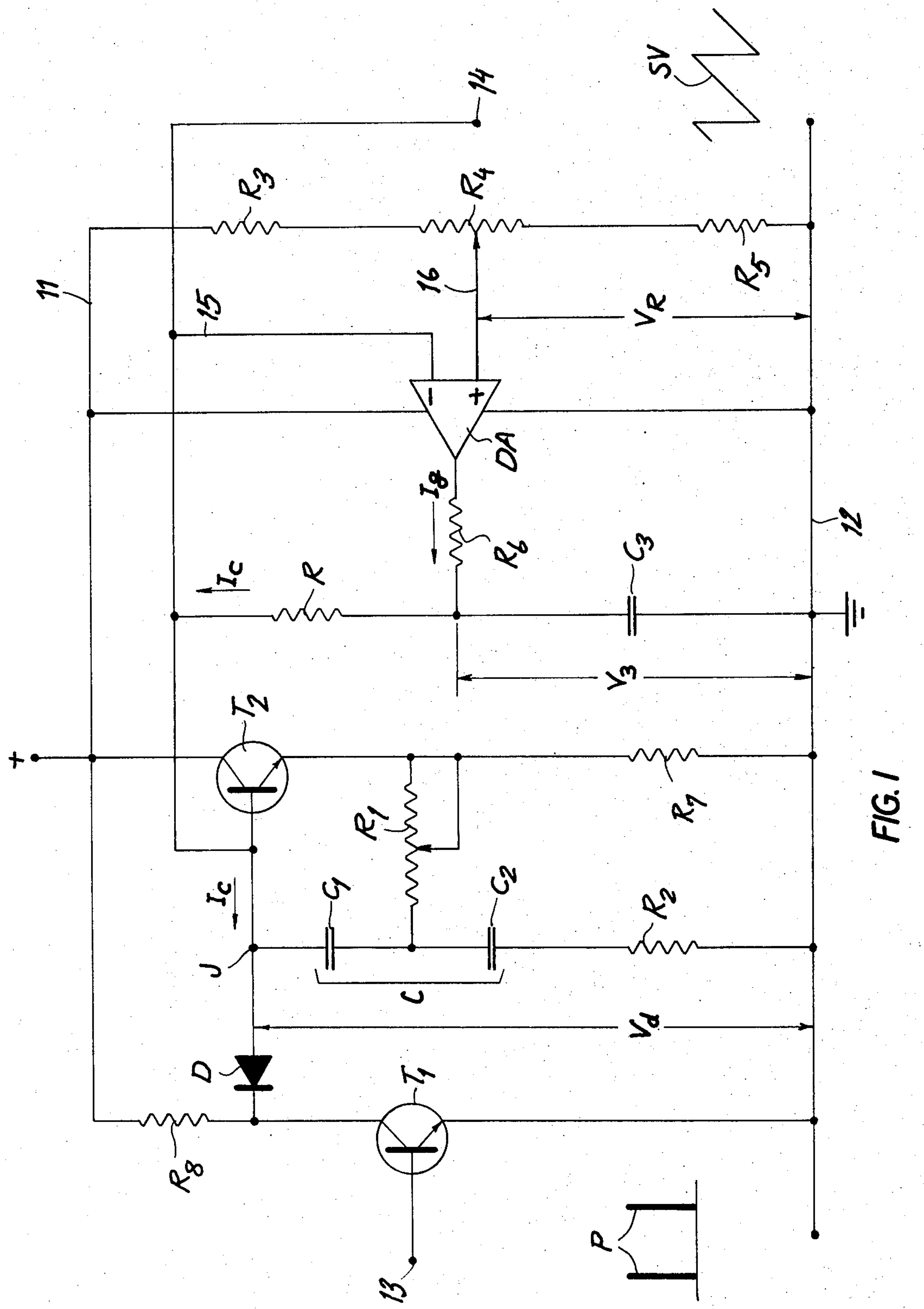
FIG. 1 is a circuit diagram of a sawtooth-voltage generator embodying the invention.

In FIG. 1 I have shown a sawtooth-voltage generator comprising a charging capacitance C composed of two condensers $C_1$, $C_2$ which are in series with each other and with a grounded resistor $R_2$. Operating energy is supplied by two bus bars 11 (positive) and 12 (grounded), control pulses P being fed in between an input terminal 13 and bus bar 12 whereas the generated sawtooth voltage SV is taken off between that bus bar and an output terminal 14. A discharge path for the capacitance $C_1$, $C_2$ includes an electronic switch $T_1$, shown as an NPN transistor with its base tied to terminal 13 and its emitter grounded, connected in series with a diode D across the series combination of condensers $C_1$, $C_2$ and resistor $R_2$. The collector of transistor $T_1$ is energized from positive bus bar 11 by way of a resistor $R_8$.

Condenser $C_1$ is shunted by a linearization circuit which includes the base and the emitter of an ancillary NPN transistor $T_2$ along with an adjustable resistor $R_1$. The emitter of transistor $T_2$ is grounded through a resistor $R_7$ while its collector is directly joined to bus bar 11.

The arrangement so far described is essentially conventional, except for the absence of a charging resistor connecting the junction J of diode D and capacitor $C_1$ to a source of positive voltage such as bus bar 11.

In accordance with the present invention I provide a differential amplifier DA in the charging circuit of capacitance $C_1$, $C_2$, this amplifier having an inverting input 15 connected to junction J; a noninverting input 16 of amplifier DA is tied to a point of fixed reference potential $V_R$ (here positive) represented by the slider of a potentiometer $R_4$ which forms part of a voltage divider $R_3 - R_5$ connected across bus bars 11 and 12. Amplifier DA, which also receives its operating voltage from these bus bars, works into junction J through an integrating network comprising two series resistors $R_6$, R and a shunt capacitor $C_3$ lying between the junction of these resistors and ground. Amplifier DA is of the high-gain type.

Voltage $V_d$ is the instantaneous amplitude of sawtooth voltage SV as developed between junction J and ground; at $V_3$ I have indicated the voltage across capacitor $C_3$, with $C_3 >> C$ where $C = C_1 \cdot C_2/(C_1 + C_2)$ represents the overall capacitance of the condenser pair $C_1$, $C_2$. Furthermore, I have designated by $I_g$ the output current of differential amplifier DA and by $I_c$ the branch of that current flowing via junction J into capacitance C and in parallel therewith into a high-resistance load connected across output terminals 12, 14.

Figure 2:
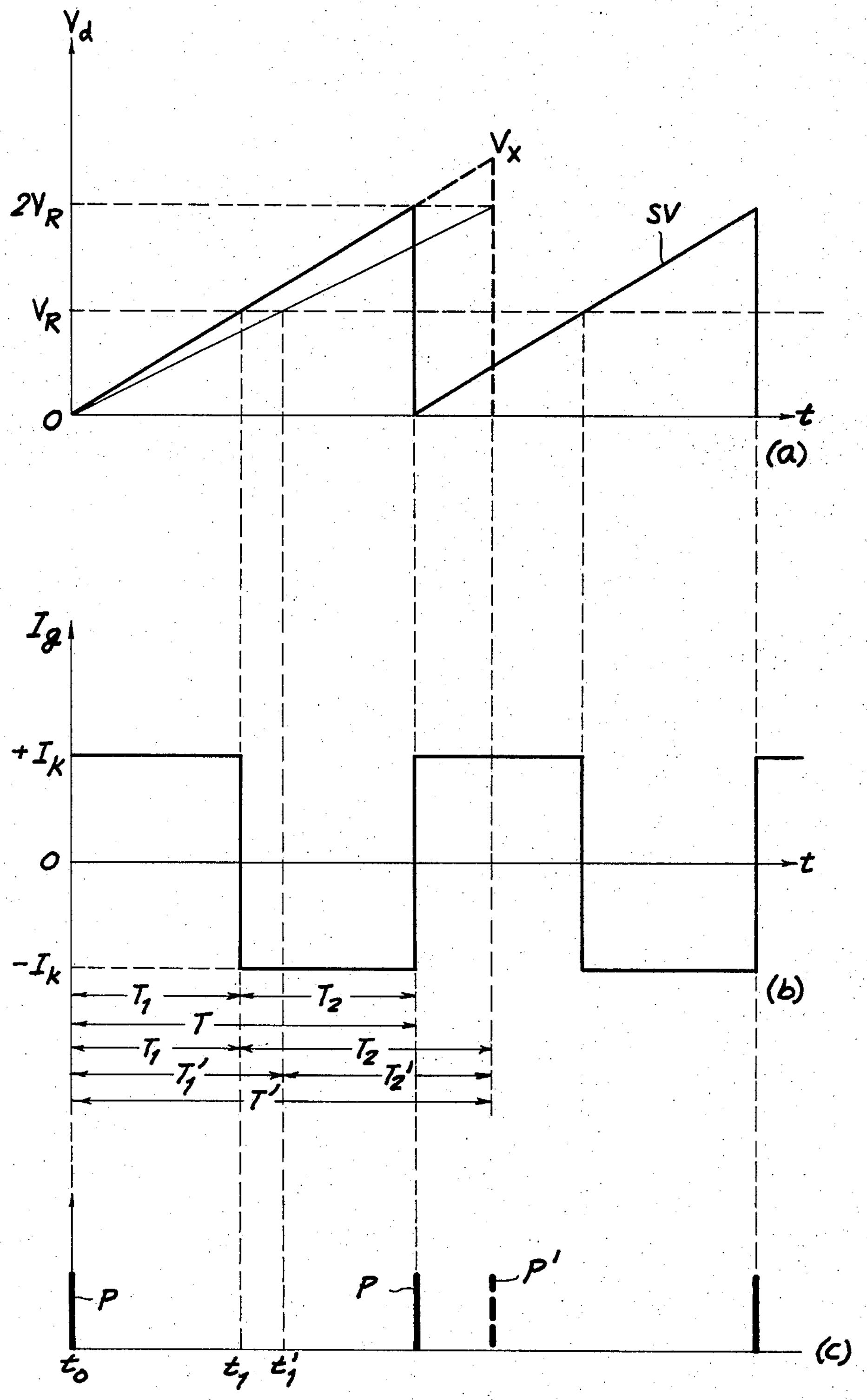
FIG. 2 is a set of graphs relating to the operation of the system of FIG. 1.

FIG. 2 shows in graph *a* the sawtooth voltage SV whose amplitude $V_d$ varies, during steady-state operation, between 0 (neglecting the forward resistance of diode D and transistor $T_1$) and $2V_R$. Graph *b* of this Figure illustrates the corresponding amplifier current $I_g$ alternating between two levels $+I_k$ and $-I_k$. The switchover from the first level $+I_k$ to the second level $-I_k$ occurs at a time $t = T_1$, reckoned from an instant $t = t_o$ which is marked by the occurrence of a control pulse P as shown in graph *c*. Voltage $V_d$ reaches its peak at time $t - t_o = T = T_1 + T_2$ when, upon the occurrence of the next control pulse, a new sawtooth is started.

Under the assumed conditions, we can establish the following approximate relationships:

$$I_c \approx V_3/R \qquad (1)$$

$$V_d \approx T{\cdot}I_c/C \approx T{\cdot}V_3/RC \qquad (2)$$

$$V_3 = V_k + T_1{\cdot}I_k/C_3 - T_2{\cdot}I_k/C_3 - T{\cdot}I_c/C_3 \qquad (3)$$

where $V_k$ is the mean value of $V_3$ in steady-state operation. Thus, for $V_3 = V_k$ equation 3 reduces to $$T_1 - T_2 = T{\cdot}I_c/I_k \qquad (4)$$

whereas from the linearity of the rising flank of voltage SV it follows that $$V_d = T{\cdot}V_R/T_1 \qquad (5)$$

If the various circuit resistances (including the load resistance) are so chosen that $I_c << I_k$, we can write $$T_1 \approx T_2 \approx T/2 \qquad (6)$$

$$V_3 \approx V_k \qquad (7)$$

and $$V_d \approx 2V_R \qquad (8)$$

which confirms the assumption made above.

If, as indicated in dotted lines at P' in FIG. 2, the occurrence of a control pulse is delayed to a time $t - t_o = T'$, voltage $V_d$ will rise for an extended period $T_2'$ beyond the switch over point $t_1$ and will reach an abnormal level $V_x$ on the first cycle. With the re-establishment of equilibrium, however, the switchover will be correspondingly delayed to an instant $t_1' = t_o + T_1'$ so that, thereafter, $$T_1' \approx T_2' \approx T'/2 \qquad (6')$$

with re-establishment of relationship 8.

This automatic readjustment of the sawtooth peak occurs over a wide range of pulse cadences, up to a ratio of 2 : 1 or even higher, as long as the voltage swing across capacitor $C_3$ (which increases with lengthening periods T) does not become so large as to impair the operation of amplifier DA.

Naturally, the magnitude of this peak voltage can be modified by adjusting the potentiometer $R_4$.

The adjustability of resistor $R_1$, together with a choice of a suitable value for capacitance $C_3$, enables not only a linearization of the rising sawtooth flank but also, if desired, a predistortion thereof, e.g., along an S curve, to compensate for nonlinearities in the deflection system, especially with large sweep angles. Such a predistortion, if symmetrical, does not significantly affect relationship 4.

I claim:

1. A sawtooth-voltage generator comprising:

capacitive means provided with a resistive charging circuit and a low-resistance discharge path;

electronic switch means in said discharge path normally blocking same;

a source of control pulses of variable repetition frequency connected to said switch means for periodically unblocking said discharge path to generate a sawtooth voltage in a load circuit connected across said capacitive means;

electronic switchover means with two operating conditions generating respective output currents of two different levels in an output circuit thereof, said switchover means having a first input connection to a terminal of said capacitive means and a second input connection to a point of fixed reference potential for changing from the first of said levels to the second of said levels upon the voltage on said terminal reaching said reference potential; and an integrating network connecting the output circuit of said switchover means across said capacitive means in said charging circuit for energizing same with maintenance of a substantially constant peak amplitude of said sawtooth voltage independent of said repetition frequency, said network having a time constant which is large compared to the recurrence period of said pulses.

2. A sawtooth-voltage generator as defined in claim 1 wherein said switchover means comprises a differential amplifier with opposite directions of current flow at said first and second levels.

3. A sawtooth-voltage generator as defined in claim 1 wherein said capacitive means comprises a pair of series condensers, further comprising a linearization circuit including an ancillary current source connected to the junction of said condensers.

4. A sawtooth-voltage generator as defined in claim 3 wherein said network includes a capacitance of a magnitude substantially exceeding the combined capacitance of said series condensers.

* * * * *